March 11, 1952  G. H. ERB  2,588,372
FASTENING DEVICE
Filed May 29, 1945
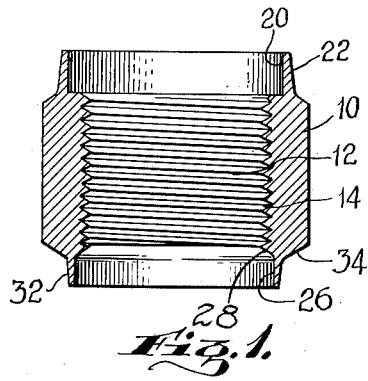
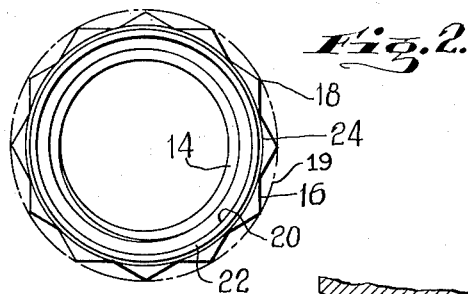
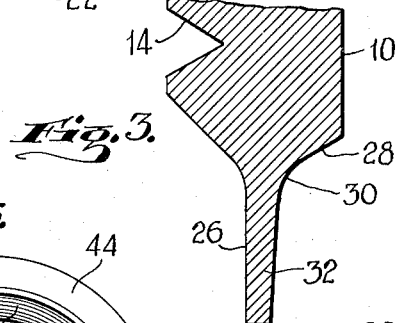
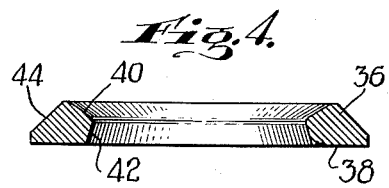
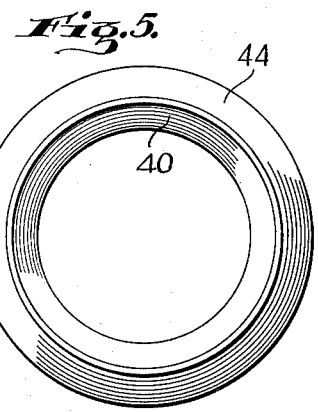
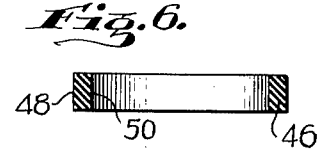
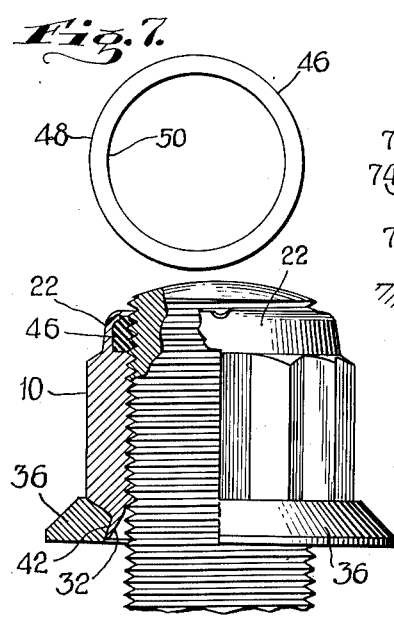
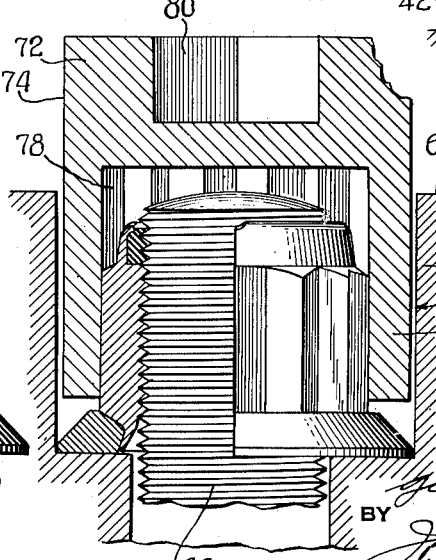
INVENTOR
George H. Erb
BY
his ATTORNEY Patented Mar. 11, 1952

2,588,372

UNITED STATES PATENT OFFICE 2,588,372

FASTENING DEVICE

George H. Erb, South Orange, N. J., assignor to Elastic Stop Nut Corporation of America, Township of Union, N. J., a corporation of Delaware Application May 29, 1945, Serial No. 596,425

6 Claims. (Cl. 85—32)

The present invention relates to threaded fastening devices, more particularly nuts. Still more particularly, the invention relates to self-locking nuts.

Nuts are required in many applications where they are subjected to relatively high degrees of stress and vibration and where space and weight limitations preclude the use of large and heavy nuts. Also, in many such cases cost factors require the use of relatively inexpensive parts.

The above general requirements provide a specification relatively difficult to meet and the general object of the present invention is the provision of a new and improved form of fasening device, specifically a nut, which will be capable of use in high tensile applications, which will be of self-locking character to withstand vibration, which will for a given thread size and degree of stress be smaller and lighter than nuts now available, and which will be readily manufacturable by mass production methods at relatively low cost.

The manner in which the above general object and other and more detailed objects, which will hereinafter be pointed out, are attained, may best be understood from a consideration of the following portion of this specification, taken in conjunction with the accompanying drawings forming a part hereof, in which:

Fig. 1 is a central longitudinal section of a blank for the body of a nut embodying the invention;

Fig. 2 is a top plan view of the blank shown in Fig. 1;

Fig. 3 is a fragmentary sectional view on enlarged scale of a part of the blank shown in Fig. 1;

Fig. 4 is a sectional view of a base member for assembling with the blank of Fig. 1;

Fig. 5 is a top plan view of the member shown in Fig. 4;

Fig. 6 is a sectional view of a locking insert;

Fig. 7 is a top plan view of the insert;

Fig. 8 is a view showing one manner of assembling the parts shown in Figs. 1, 4 and 6;

Fig. 9 is a view half in side elevation and half in central section of the completed nut; and Fig. 10 is a view partly in elevation and partly in section showing the manner of installation of the nut in a masked location.

Referring now to the drawings:

The blank indicated generally at 10 in Fig. 1 comprises an annular body having a bore 12 provided with the desired internal thread 14. Externally the body 10 is provided with a multiplicity of tool-engaging faces 16 and, as will be observed from Fig. 2, the preferred number of such faces is 24, provided by making the external perimeter in the form of two hexagons symmetrically offset circumferentially, thus providing twelve projecting points of intersection 18 lying on a circumscribing circle 19 from which the twenty-four surfaces extend inwardly to points of intersection lying on the inscribing circle 24 concentric with circle 19. Since the two hexagons are offset by 30° it will be evident that each pair of surfaces or flats between any two adjacent points 18 on the circumscribing circle define an included angle between them of 150°.

At its upper end the bore 12 is counterbored to provide a recess 20 and externally the body is turned down to provide a relatively thin annular wall 22, the outer diameter 24 of which at the base of the flange is preferably the same as the diameter of the inscribed circle of the faces 16.

At its lower or base part bore 12 is counterbored as at 26, this counterbore being connected to the main bore 12 by a conical shoulder 28 the angle of inclination of which is advantageously of the order of 45° and which preferably is joined to the counterbore 25 by a small fillet 30. The external part of the flange at the base is turned down to form a depending flange or skirt 32, the outer face of this flange being preferably slightly tapered as shown. Immediately above the skirt 32 the body of the blank is formed to provide a conical shoulder or abutment 34, the surface of which is advantageously inclined at an angle of approximately 60 degrees with respect to the axis of the nut, although this angle may vary.

Referring now to Fig. 4, the base member of the device is shown as consisting of an annular ring or washer indicated at 36. This washer is preferably of high tensile strength material such as hardened steel and is provided with a flat base surface 38 and an internal bore consisting of two frusto-conical portions, the upper portion 40 having the same angle of inclination with respect to the axis as that of the abutment 34 on the main nut body and the lower portion 42 having a smaller angle of inclination than that of the upper portion. In the present embodiment the angle of inclination of the surface 42 is of the order of 20°. Externally the member is advantageously provided with a bevel 44, the angle of which may be as desired but which may advantageously be at 60° to the axis.

Figs. 6 and 7 show in section and elevation a locking insert 46 for use in the device, this being an annular ring or washer of elastic material capable of having a thread impressed therein. The outer diameter 48 of the ring is made so as to fit snugly in the counterbore 20 in the nut body and the inner diameter 50 is made smaller than the major diameter of the thread 14 and preferably larger than the minor diameter of that thread. The diameter 50 may advantageously approximate the pitch diameter of thread 14. As will be noted from the figures, the height of the washer is somewhat greater than the wall thickness.

While the present invention is not restricted in its broader aspects to the employment of any one particular material for the insert 46, for reasons hereinafter more fully explained, the preferred material is of that class of plastic commonly known under the generic name of Nylon. Also, in so far as this invention is concerned the bore 50 may be provided with a partial depth thread or other surface configuration such that the thread ultimately formed in the washer when the nut is applied need not be formed wholly by impression by a bolt thread.

Referring to Fig. 8, a preferred method of assembling the parts of the nut is illustrated, the parts being shown in their relatively proper assembly positions ready to be locked together. Assembly may be accomplished in one operation between two confronting punches 52 and 54 mounted in a suitable punch press and having relative movement toward and away from each other.

The punch 52 is provided with a concave forming surface 56 which, as the punch descends, turns the top of the flange 22 inwardly over the insert 46 to clamp it tightly in place and is further advantageously provided with one or more peripherally spaced projections 58 to form indentations which are forced into the material of the insert in order to aid in preventing turning of the insert within the recess. Advantageously the punch 52 is provided with a central pilot 60 which is projected into the inner bore of the insert before the forming part of the punch 52 moves downwardly to turn or crimp the flange over the insert. This method of assembling the insert is disclosed in Swanstrom Patent No. 2,070,032, granted February 9, 1937.

Since this assembling of the insert is effected by axially applied force the locking of the base member 36 is readily accomplished in the same operation by utilizing the punch 54 having a conical nose 62 to flare the skirt 32 into tight pressure contact with the bore portion 42 of member 36. Due to the inclination of these surfaces the surface 40 on the base member is also forced into tight contact with the abutment shoulder 34 on the nut body.

As will be observed, the length of skirt 32 is related to the height of the surface 42, so that the lower end of the skirt does not project beyond the plane of the base surface 38 and is preferably slightly above that plane.

For some uses it will be desirable to have the base member not turnable relative to the main body, while for other uses it may be desirable to permit it to turn relative to the body to avoid marring the surface against which the nut is screwed. Ordinarily pressure contact from the assembly can be made sufficient to prevent turning if that is desired, but in addition knurled or otherwise roughened contact surfaces may be used.

After the punches have been brought together to effect the above described assembling operation, the resultant product has the appearance shown in Fig. 9.

By utilizing the principles of the present invention it is possible to provide a high tensile strength nut of smaller dimensions than standard nuts for the same bolt size, which, even though smaller than the standard nuts, are capable of being subjected to heavier loads without injury or distortion than the comparable standard nut of larger dimensions.

When a nut is subjected to stress due to tension applied to the bolt on which it is threaded, the nut is subjected, in addition to other stresses, to what is termed "hoop" stress which tends to spread the nut radially at its base and in fact tends to turn the nut inside out. If the nut yields to such stress the threads in the base portion of the nut become less effective and consequently the strength of the nut to resist destruction by stripping of the threads is reduced. Also, if, under the influence of hoop stress, the base of the nut stretches beyond its elastic limit, the permanent distortion makes it difficult if not impossible to apply a wrench to the nut for the purpose of removing it. In order to provide sufficient strength to resist hoop stress, ordinary nuts are provided with a wall thickness which has resulted in the establishment of certain standard external dimensions for given thread sizes, but in accordance with the present invention the size of the nut, in so far as the main nut body to which a tool is applied is concerned, is capable of being made sufficiently smaller than standard for a given thread size so that a size smaller tool can be used than on a standard nut of the same thread size. Not only is this accomplished by the invention, but the resultant nut may be even stronger than a comparable standard nut.

One of the factors productive of this result is the form and nature of the base member or ring 36 and the provision thereon of the conical contact surface 40 which bears against the complementary surface 34 on the main nut body. As will be evident from inspection of Fig. 9, if the nut is applied so as to produce tension on the bolt 66, hoop stress is created, tending to spread the base of the nut body. At the same time, however, due to the slope of the conical contacting faces 40 and 34, the tension creates a substantial force component directed radially inwardly and tending to compress the base of the main nut body, this force acting in opposition to and counteracting the so-called hoop stress force. Under stress, the parts may have some relative movement with the base portion of the nut body moving into the base member, but such movement will be only within the elastic limits of the materials and consequently of extremely small extent. However, the nature of the surfaces of the faces 34 and 40 should not preclude the possibility of the base member exerting the desired compressive force on the base portion of the nut body due to relative movement, however small. When this action takes place the base member 36 is of course placed under tension acting peripherally of the ring but, as will be apparent, it is not only possible but thoroughly practical to make this base or ring member of material capable of resisting well within its elastic limit the maximum hoop stress that can be applied by a high quality bolt without breaking the latter. Because of considerations of cost, machining difficulties, etc., it is undesirable to use such material for a threaded nut body and, moreover, when the hoop stress is counteracted by a base ring it is possible to make the wall of the nut body thinner than would otherwise be practical, with the result that the size and the overall weight of the nut can be reduced.

The reduction in the external size of the nut is further aided by another feature of the invention which provides what may be termed a double hexagon external configuration. By employing a double hexagon rather than a single hexagon configuration, greater wall thickness in the nut body is obtained with a given size of hexagon. The reason for this may be seen from Figure 2. In the double hexagon construction illustrated, the wall thickness of the nut body is determined by the diameter of the circle 24 which it will be observed is not sufficiently great to create interference with the application of a wrench to the engaging surfaces 16. It will further be observed, however, that this circle is of greater diameter than the distance across the opposite faces or flats of a single hexagon, so that the minimum wall thickness illustrated could not be used with a single hexagon configuration of the same size. At the same time a greater bearing area for a tool is provided by the double hexagon construction than would be the case with a single hexagon.

As illustrative of some of the advantages resulting from the above discussed aspects of the invention, I have found, from actual construction and test, that a nut for a ½" bolt having a main nut body formed of S. A. E. C-1137 steel, which is readily machined and threaded, and a base ring or member of S. A. E. 8637 steel, the former having a Rockwell C-scale hardness of 28–32 and the latter a hardness of 42–47 will resist, without appreciable distortion, the maximum stress that can be imposed on the nut by a bolt having a tensile strength of 150,000 lbs. per square inch, the body of the nut being smaller than a standard hexagon body for the same thread size by one full wrench size. Tests of ordinary nut bodies of comparable size and of the same material show them to have a maximum strength of only approximately half that of nuts embodying the principles of the present invention. The ability to provide an increased minimum wall thickness for a given overall external dimension of the nut is also an important factor in enabling the self-locking feature of the nut to be incorporated in its construction. The reason for this is that a certain minimum radial thickness of locking insert or washer is required. In the operation of the nut, the self-locking action is created by the impression of a thread in the locking insert as the nut is screwed on the bolt. This involves internal displacement of the material of the insert and creates a compression pressure acting continuously to grip the bolt threads due to the elastic nature of the material of the insert. For this to be most effective, the radial inner part of the insert, which is plastically displaced by the impression of the thread, should be backed up by an outer body of material that is relatively very much less displaced and which provides a solid elastic body under compressive pressure for applying the desired gripping force to the bolt. By virtue of the thicker wall obtainable in a nut of given size by the present invention, the diameter of the recess or well in which the insert is fixed may be made larger than would otherwise be the case and consequently an amount of material greater than would otherwise be usable can be employed in the insert, with consequent improvement in its action. Also, it is preferable to employ, as the material for the insert, a homogeneous plastic such as nylon rather than a laminated material such as fiber, heretofore extensively used, since the insert is relatively narrow radially and the homogeneous plastic material is not subject to the tendency to split as characteristic of relatively narrow bands of laminated material.

As previously noted, the present device is particularly suited for installation where it is desired to mask the nut in a socket or recess and in Fig. 10 an installation of this character is shown to illustrate the applicability of the nut for such use. As seen in this figure, there is a body 64 through which a bolt 66 passes and which it is desired to secure without having the bolt or nut project beyond the surface 68 of the body. The body is counterbored at 70 and as will be seen from the illustration, the nut may be screwed home on the bolt by means of an internal socket wrench 72 of known kind having an external cylindrical outer surface 74 and an annular skirt 76 provided with a multiplicity of nut engaging tool faces 78 complementary to the faces 16 on the nut. The tool 72 has been shown in the usual form provided with a polygonal socket 80 for the reception of any desired bit for turning the tool.

From the foregoing it will be apparent that by utilizing the principles of the present invention, numerous advantages are attainable and that they may be incorporated in fastening devices of forms other than the specific form described and illustrated herein by way of example. The invention is accordingly understood to be embracing all devices falling within the scope of the appended claims.

What I claim is:

1. A nut comprising a circumferentially continuous body member having a main internally threaded portion, a relatively thin walled annular skirt depending therefrom and a conical shoulder outside said skirt, and a separate annular base ring of material of greater tensile strength than that of said body member encircling said skirt, said ring having a base surface providing the base of the nut and a bore comprising two opposed frusto-conical surfaces, one of said surfaces being complementary to and engaging said shoulder and said skirt being expanded to engage the other surface to retain the ring in place, the bottom edge of said skirt terminating short of the plane of said base surface.

2. A nut comprising a main circumferentially continuous annular body portion having an internally threaded bore, an outer surface providing a multiplicity of tool engaging flats formed by two hexagons symmetrically offset circumferentially, an annular skirt depending from said main body portion and a conical shoulder around said skirt adjacent one end of the threaded bore, and a separate base ring around said skirt, said ring being of material of greater tensile strength than that of said body portion and having a conical surface closely encircling said skirt and engaging said shoulder for exerting radial compressive force on said body portion when the nut is applied, said ring further being in the form of an annulus of relatively heavy radial cross section as compared with the radial cross section of said annular body portion and having a working engaging surface normal to the axis of the nut, a substantial portion of said surface being located within the circumscribing circle of said annular body portion, said skirt being flared into a portion of the bore of said base ring to retain the latter in place.

3. In a nut, a circumferentially continuous main body having an internally threaded bore and a multiplicity of tool engaging flats located on the exterior surface of said main body, said flats being in the form of two hexagons symmetrically offset circumferentially with respect to each other and of a size such that the distance across flats is less than that of a standard hexagonal nut of the same thread size, said configuration providing flats having an inscribed circle of greater diameter than that of a single hexagon having the same distance across flats, an annular recess at one end of the threaded bore, said recess being defined by a circular wall lying within the inscribed circle of the flats, whereby to permit a socket tool to pass over said wall and engage said flats, and an annular locking insert of elastic material fixed in said recess to have a thread impressed therein by a threaded element screwed through said bore.

4. The method of making a self-locking nut which includes the steps of forming an annular nut body having a main internally threaded bore portion, an annular skirt extending from one end of said bore portion and an annular internal recess defined by an annular wall at the opposite end of said bore portion, placing an annular base ring around said skirt an an annular locking insert in said recess, and expanding said skirt inside said ring and crimping said wall inwardly over said insert by the aid of opposed punch elements engaging the opposite ends of said body and movable relatively toward each other.

5. A nut comprising an annular body portion having an internally threaded bore and a multiplicity of longitudinally extending external tool-engaging flats on the exterior surface of said portion formed by two hexagons symmetrically offset circumferentially and providing an external configuration having an inscribed circle of a greater diameter than that of a single hexagon having the same distance across the flats, and a reinforcing flange portion of greater diameter than said annular body portion formed on one end of said nut, no portion of said nut beyond the end of said tool-engaging flats opposed to said flange portion being of greater diameter than said inscribed circle.

6. A nut comprising an annular body portion having an internally threaded bore and an external surface provided with only twenty-four longitudinally extending tool-engaging flats, said tool engaging flats substantially conforming to the external periphery of two superimposed hexagons symmetrically offset circumferentially, said external surface providing an external configuration having a minimum diameter greater than that of a single hexagon having the same distance across the flats, and a reinforcing flange of greater diameter than said annular body portion formed on one end of said nut, no portion of said nut beyond the end of said tool-engaging flats opposed to said flange being of greater diameter than a circle inscribed within said tool-engaging flats.

GEORGE H. ERB.

REFERENCES CITED

The following references are of record in the file of this patent:

UNITED STATES PATENTS

| Number | Name | Date |
|---|---|---|
| 372,957 | Bradley | Nov. 8, 1887 |
| 894,874 | Bryce | Aug. 4, 1908 |
| 1,330,673 | Anderson | Feb. 10, 1920 |
| 1,384,019 | Johnston | July 5, 1921 |
| 1,919,552 | Hasselquist | July 25, 1933 |
| 1,928,769 | Teetor | Oct. 3, 1933 |
| 1,961,470 | Winchester | June 5, 1934 |
| 2,026,757 | Swanstrom | Jan. 7, 1936 |
| 2,067,773 | Long | Jan. 12, 1937 |
| 2,103,944 | Gullborg | Dec. 28, 1937 |
| 2,204,385 | Schmidt et al. | June 11, 1940 |
| 2,230,821 | Gray | Apr. 28, 1942 |
| 2,371,121 | Basquin | Mar. 6, 1945 |
| 2,375,249 | Richer | May 8, 1945 |
| 2,385,851 | Swanstrom | Oct. 2, 1945 |

FOREIGN PATENTS

| Number | Country | Date |
|---|---|---|
| 20,045 | Great Britain | Aug. 31, 1897 |
| 153,562 | Switzerland | Mar. 31, 1932 |